(12) United States Patent
Kim (10) Patent No.: US 9,169,919 B2
(45) Date of Patent: Oct. 27, 2015

(54) ASSEMBLY OF KNOB AND LEVER

(71) Applicant: Hyundai Motor Company, Seoul (KR)

(72) Inventor: Jang Ho Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 13/869,354

(22) Filed: Apr. 24, 2013

(65) Prior Publication Data

US 2014/0119820 A1    May 1, 2014

(30) Foreign Application Priority Data

Oct. 29, 2012   (KR) .................. 10-2012-0120251

(51) Int. Cl.
*F16H 59/02*    (2006.01)

(52) U.S. Cl.
CPC ......... *F16H 59/0278* (2013.01); *Y10T 403/604* (2015.01)

(58) Field of Classification Search
CPC ... F16D 1/0835; F16D 1/0829; F16D 1/0841; F16D 1/0823; B25G 3/28; B25G 3/24; B25G 3/34; G05G 1/12
USPC .................. 403/365–368, 371, 372, 328, 351, 403/359.5; 16/406, 412–414, 422, 441; 74/548, 543

See application file for complete search history.

(56) References Cited

U.S. PATENT DOCUMENTS

| | | | | |
|---|---|---|---|---|
| 2,798,748 A * | 7/1957 | Maurer | ......................... | 403/372 |
| 3,690,728 A * | 9/1972 | Krekeler | ....................... | 299/109 |
| 3,750,489 A * | 8/1973 | Caldwell | ......................... | 74/434 |
| 4,006,659 A * | 2/1977 | Wurzel et al. | ................. | 411/518 |
| 4,183,280 A * | 1/1980 | Hashimoto | .................. | 411/518 |
| 5,588,329 A * | 12/1996 | Nedachi | ..................... | 74/473.36 |

FOREIGN PATENT DOCUMENTS

| | | |
|---|---|---|
| KR | 10-1998-052180 | 9/1998 |
| KR | 20-0238055 | 11/2001 |
| KR | 10-0457126 B1 | 11/2004 |
| KR | 10-0461820 B1 | 12/2004 |

* cited by examiner

*Primary Examiner* — Daniel Wiley
(74) *Attorney, Agent, or Firm* — McDermott Will & Emery LLP (57) ABSTRACT

An assembly includes a knob, a lever, and a spring clip. The knob includes a substantially cylindrical hollow part having a first inner diameter, and an accommodating groove extending along the hollow part and having a second inner diameter larger than the first diameter. The lever includes a substantially cylindrical body part having a diameter corresponding to the first diameter, and a seating groove formed in the body part at a position of the body part facing the accommodating groove when the knob is assembled to the lever. A spring clip is fitted onto the seating groove of the lever such that the spring clip is disposed in a space formed between the accommodating groove and the seating groove when the knob is assembled to the lever. The spring clip provides a coupling force between the knob and the lever.

12 Claims, 6 Drawing Sheets

ASSEMBLY OF KNOB AND LEVER

CROSS-REFERENCE TO RELATED APPLICATION

This application is based on and claims priority from Korean Patent Application No. 10-2012-0120251, filed on Oct. 29, 2012 in the Korean Intellectual Property Office, the disclosure of which is incorporated herein by reference in its entirety.

BACKGROUND

1. Technical Field

The present disclosure relates to a knob and a lever, and more particularly, to a knob assembly configured be readily and securely assemble a knob to a lever without requiring additional components.

2. Description of Related Art

A transmission lever unit generally includes a knob and a lever disposed at a lower portion of the knob.

The knob and the lever generally have structures that enable them to be screwed to each other. However, since it takes a lot of time to perform the screwing, assembling productivity is low. Furthermore, because the screw-based assembly does not provide a fixed orientation for the knob, a subsequent process is required in order to adjust the orientation of a front surface of the knob.

Various assembly structures including a knob and a lever have been proposed, including one-touch assemblies such as those described in Korean Patent Application No. 2006-37798, Korean Patent Application No. 2007-96261, Korean Patent Application No. 2009-70128, and Korean Patent Application No. 2006-115205. However, in each of the described assemblies, the number of components required to assemble the knob to the lever is large, shapes of the knob and/or lever are complicated, and the knob and the lever may be separated from each other in situations in which a large external force is applied thereto.

Thus, while the e one-touch assembly structures provide a straightforward method of assembly, they require large numbers of components and the resulting knob and lever assemblies can become separated from each other.

SUMMARY

Accordingly, the present disclosure describes knob and lever assemblies that have been developed to solve the above-mentioned problems occurring in the prior art while maintaining many of the advantages achieved by the prior art assemblies.

In one aspect of the present disclosure, there is provided an assembly of a knob and a lever including: the knob including a substantially cylindrical hollow part formed in the knob, the hollow part extending downwardly through the knob to an opening in a bottom surface of the knob, and an accommodating groove formed in the knob, the accommodating groove extending along the hollow part and having an inner diameter larger than an inner diameter of the hollow part; the lever including a substantially cylindrical body part having a diameter corresponding to the inner diameter of the hollow part, and a seating groove formed in the body part to have a diameter smaller than that of the body part, wherein the seating groove is formed in the body part at a position of the body part that faces the accommodating groove when the knob is assembled to the lever; and a spring clip having a plurality of rings configured to be fitted onto the seating groove of the lever, having an inner diameter larger than the diameter of the seating groove and smaller than the diameter of the body part, and having an outer diameter larger than the diameter of the body part, wherein in a process of assembling the lever into the knob with the spring clip fitted onto the lever, the outer diameter of the spring clip is compressed by the inner diameter of the hollow part of the knob as the lever is fitted into the knob, and the outer diameter of the spring clip expands into the accommodating groove of the knob when the lever is assembled to the knob, such that the spring clip is disposed in a space formed between the accommodating groove and the seating groove to provide a coupling force between the knob and the lever when the knob is assembled to the lever.

The spring clip may include slits formed along a side of the spring clip such that the spring clip is compressible in a radial direction.

The knob may include guide grooves formed at predetermined positions along the hollow part. The lever may include guide protrusions formed on the body part at predetermined positions thereof. Each guide protrusion may have a shape complementary to the shape of a corresponding guide groove, and corresponding guide grooves and guide protrusions may be configured to be aligned when the knob is in a predetermined orientation with respect to the lever.

The hollow part may have a first inclined surface formed along the opening in the bottom surface of the knob, wherein the first inclined surface has an upper end diameter equal to the inner diameter of the hollow part and a lower end diameter larger than the inner diameter of the hollow part.

The accommodating groove may have a second inclined surface formed at a lower end thereof, wherein the second inclined surface has an upper end diameter smaller than the diameter of the accommodating groove and larger than the inner diameter of the hollow part and a lower end diameter equal to the inner diameter of the hollow part.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Hereinafter, exemplary embodiments of the present disclosure will be described in detail with reference to the accompanying drawings.

Figure 1A:
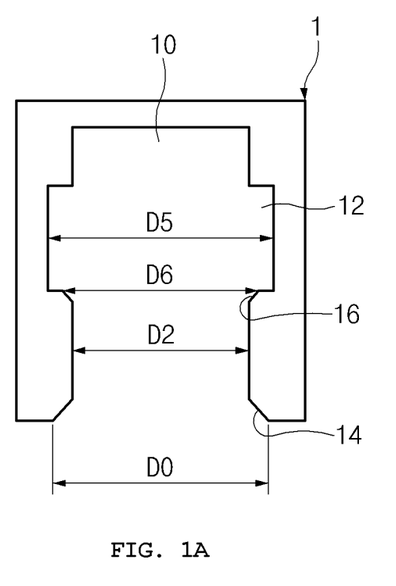
FIG. 1A is a side cross-sectional view of a knob according to an exemplary embodiment of the present disclosure.
Figure 1B:
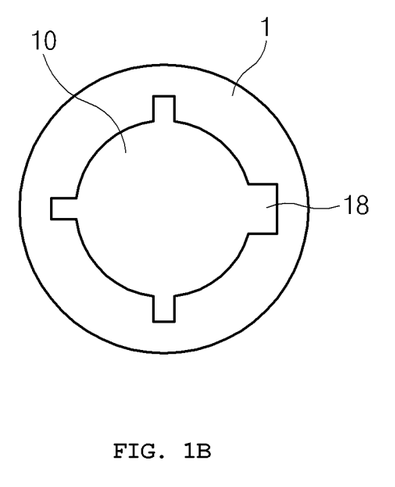
FIG. 1B is a plan view of the bottom surface of a knob according to another embodiment of the present disclosure.
Figure 2A:
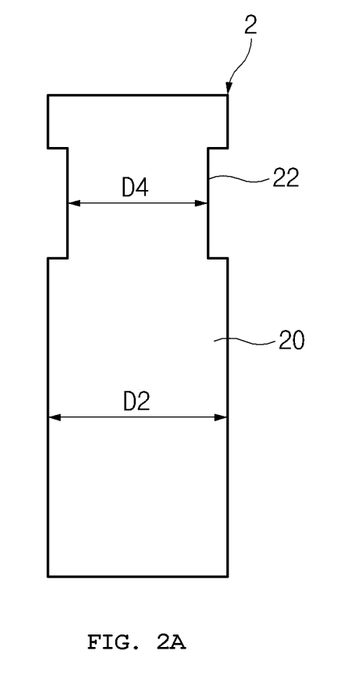
FIG. 2A is a side cross-sectional view of a lever according to the exemplary embodiment of the present disclosure.
Figure 2B:
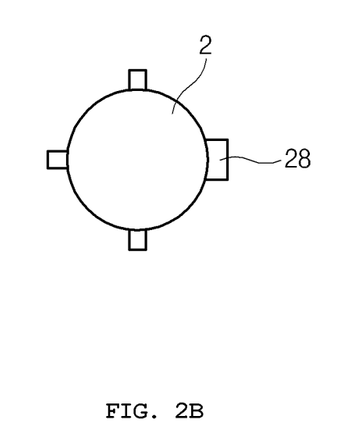
FIG. 2B is a plan view of the top surface of a lever according to another embodiment of the present disclosure.
Figure 3A:
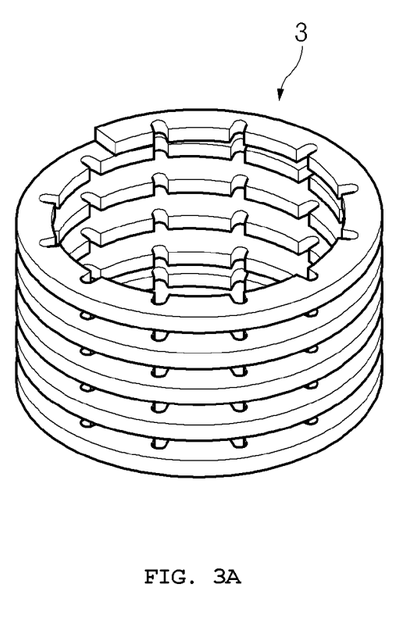
FIGS. 3A and 3B are, respectively, a perspective view and a plan view of a spring clip having a plurality of rings according to the exemplary embodiment of the present disclosure.
Figure 3B:
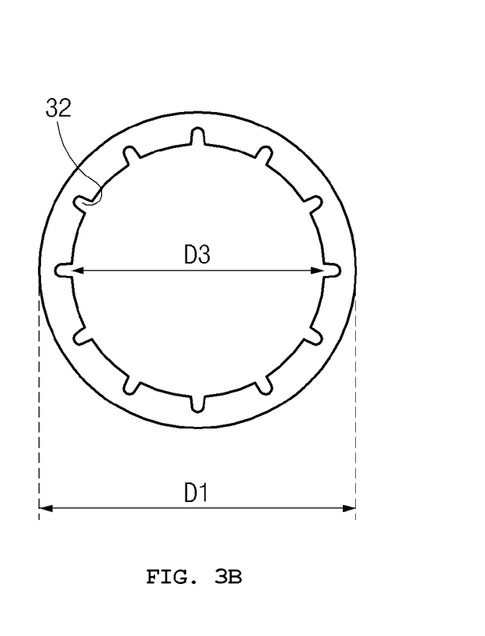

FIG. 1A is a side cross-sectional view of a knob according to an exemplary embodiment of the present disclosure; FIG. 1B is a plan view of the bottom surface of a knob according to another embodiment of the present disclosure, where the structure of the knob includes guide grooves;

FIG. 2A is a side cross-sectional view of a lever according to the exemplary embodiment of the present disclosure; FIG. 2B is a plan view of the top surface of a lever according to another embodiment of the present disclosure, where the structure of the lever includes guide protrusions; In addition, FIGS. 3A and 3B are, respectively, a perspective view and a plan view of a spring clip according to the exemplary embodiment of the present disclosure.

According to the exemplary embodiment of the present disclosure, an assembly is capable of maintaining a strong coupling force between a knob and a lever while enabling the knob and lever to be assembled to each other by a one-touch process. The assembly includes only three components: the knob 1, the lever 2, and a spring clip 3.

The knob is described with reference to FIG. 1A. The knob 1 includes a substantially cylindrical hollow part 10 formed in the knob to have an inner diameter D2, the hollow part 10 extending downwardly through the knob 1 to an opening in a bottom surface of the knob 1. An accommodating groove 12 is formed in the knob 1 and extends along the hollow part 10. The accommodating groove 12 has an inner diameter D5 larger than the inner diameter D2 of the hollow part 10. The hollow part 10 further has a first inclined surface 14 formed at a lower end thereof along an edge of the hollow part 10 and emerges from the opening in the bottom surface of the knob 1. The first inclined surface 14 facilitates coupling of a spring clip 3 (shown in FIG. 3) to the hollow part 10. The first inclined surface 14 may be configured to have an upper end diameter equal to the inner diameter D2 of the hollow part 10 and to have a lower end diameter D0 equal to or larger than an outer diameter D1 of the spring clip 3. In addition, the accommodating groove 12 has a second inclined surface 16 formed at a lower end thereof in order to facilitate separation of the knob 1 from a lever when the knob 1 is separated from the lever for maintenance of the knob and/or of the lever. The second inclined surface 16 may be configured to have an upper end diameter D6 smaller than the outer diameter D1 of a spring clip 3 and larger than the inner diameter D2 of the hollow part 10, and to have a lower end diameter substantially equal to the inner diameter D2 of the hollow part 10.

As shown in FIG. 1B, the knob 1 may include guide grooves 18 formed in a vertical direction along the inner surface of the hollow part 10 inside of the knob 1.

Next, referring to FIG. 2A, the lever 2 includes a substantially cylindrical body part 20 having a diameter D2 corresponding to the inner diameter D2 of the hollow part 10. The lever 2 further includes a seating groove 22 formed in the substantially cylindrical body part 20 as a portion of the substantially cylindrical body part 20 having a diameter D4 smaller than the diameter D2 of the body part 20. The seating groove 22 may be formed on a portion of the body part 20 that faces and is substantially level with the accommodating groove 12 of the hollow part 10 when the lever 2 is fully inserted into the hollow part 10 of the knob 1. Here, although the body part 20 can be configured to have a diameter D2 substantially equal to the inner diameter D2 of the hollow part 10, the body part 20 may also be configured to have a diameter D2' slightly smaller than the inner diameter D2 of the hollow part 10 in order to facilitate insertion of the body part 20 into the hollow part 10 as part of coupling the knob to the lever 2.

As shown in FIG. 2B, the lever 2 may include guide protrusions 28 formed on an outer surface of the body part 20 at positions facing or otherwise corresponding to positions of the guide grooves 18 of the hollow part 10 when the body part 20 is properly oriented with respect to the hollow part 10 and/or inserted into the hollow part 10.

When the knob 1 is coupled to the lever 2, the guide protrusions 28 are fitted along or into the guide grooves 18 when the knob 1 and lever 2 are in a predetermined orientation with respect to each other. If the knob 1 and lever 2 are not in the predetermined orientation, however, the guide protrusions 28 are not lined up with the guide grooves 18 and a process of assembling the knob 1 and the lever 2 to each other cannot proceed. In such a situation, the orientation of the knob 1 and the lever 2 can be easily adjusted to enable the assembling process to proceed. The guide grooves 18 and the guide protrusions 28 can be formed to have different shapes or widths, as shown in FIGS. 1 and 2, in situations in which a plurality of guide grooves 18 and a plurality of guide protrusions 28 are used, such that the arrangement of the knob 1 with respect to the lever 2 may only be performed when a particular groove 18 is lined up with a corresponding protrusion 28 having a complementary shape or width, so as to ensure that the knob 1 and lever 2 are in the predetermined orientation with respect to each other.

In an alternative embodiment the guide protrusions may be formed on the lever (e.g., a lever made of metal). In the alternative embodiment, the orientation or direction of the knob may be adjusted by press-fitting the knob onto the lever. In the alternative embodiment, no guide grooves may be formed in the hollow part of the knob (e.g., a knob made of a plastic material) prior to assembling the knob onto the lever.

Referring to FIG. 3, the spring clip 3 having a plurality of rings has an inner diameter D3 that is larger than the diameter D4 of the seating groove and smaller than the diameter D2 of the body part 20. The spring clip 3 further has an outer diameter D1 that is larger than the diameter D2 of the body part 20. The spring clip 3 includes a plurality of slits 32 formed at a same/regular interval along an inner diameter side of the spring clip along a length direction of the spring clip 3 to provide flexibility to the spring clip 3 and allow the diameter of the spring clip 3 to be compressed or contracted in a radial direction. Although not shown, the slits may additionally or alternatively be formed at the same interval along an outer diameter side of the spring clip 3, for example at positions that do not face or otherwise correspond to the positions or slits 32 formed along the inner diameter side. The slits formed along the outer diameter side may similarly allow the diameter of the spring clip 3 to be compressed or contracted, if used in conjunction with the slits formed along the inner diameter side may enable the diameter of the spring clip 3 to be more easily compressed or contracted (e.g., by requiring less force to compress the spring clip 3). The disposition, the number, and the like, of the slits 32 not only facilitate the compression or contraction of the diameter of the spring clip 3, but also enable the force required to separate the knob from the lever to be adjusted.

The spring clip 3 is used to couple the knob 1 and the lever 2 to each other in a situation in which the spring clip 3 is first fitted onto the seating groove 22 of the lever 2 as shown in FIGS. 4A to 5B. Since the inner diameter D3 of the spring clip 3 is smaller than the diameter D2 of the body part 20 and is larger than the diameter D4 of the seating groove, the spring clip 3 is maintained seated in the seating groove 22 once it is fitted onto the lever 2. Furthermore, because the inner diameter D3 of the spring clip 3 is larger than the diameter D4 of the seating groove, a space is provided between the spring clip 3 and the seating groove 22 (i.e., a space provided between the diameters D3 and D4) to allow for the contracting of the spring clip 3. In addition, since the outer diameter D1 of the spring clip 3 is larger than the diameter D2 of the body part 20, the spring clip 3 protrudes outwardly from the body part 20 of the lever 2 when it is fitted onto the lever 2.

A process of coupling the knob 1 to the lever 2 is described below with reference to FIGS. 4A to 4E.

Figure 4A:
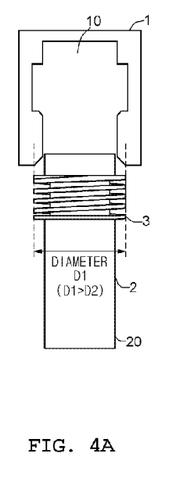
FIGS. 4A to 4E are side views showing steps of a process in which the knob is assembled to the lever according to the exemplary embodiment of the present disclosure.
Figure 4B:
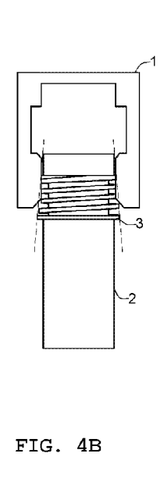
Figure 4C:
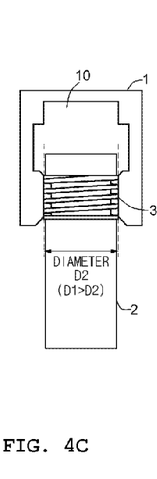

First, when the knob 1 starts to be fitted onto the lever 2 as shown in FIG. 4A, the body part 20 of the lever 2 starts to be fitted into the hollow part 10 of the knob 1. As a process of continuously lowering the knob 1 to fit the knob 1 onto the lever 2 proceeds, an upper end of the spring clip 3 meets a lower end of the hollow part 10. In this situation, since the inner diameter D0 of the first inclined surface 14 formed at the lower end of the hollow part 10 is equal to or larger than the outer diameter D1 of the spring clip 3, the spring clip 3 may be radially compressed or contracted as the spring clip 3 is fitted into the hollow part 10. As shown in FIG. 4B, the spring clip 3 starts to be compressed or contracted from the upper end thereof. Then, as the knob 1 is continuously lowered onto the lever 2, the spring clip 3 is compressed or contracted in a radial/diameter direction until it is completely compressed or contracted as shown in FIG. 4C. That is, the outer diameter of the spring clip 3 is compressed or contracted by the inner diameter of the hollow part 10 of the knob 1 at a position at which the spring clip 3 contacts the inner diameter of the hollow part 10 of the knob 1 as shown in FIG. 4C, such that the spring clip 3 is compressed or contracted to have an outer diameter equal to D2. The compression or contraction of the spring clip 3 may be more easily induced in embodiments in which slits (e.g., 32) are formed in the spring clip 3.

Figures 4D, 4E:
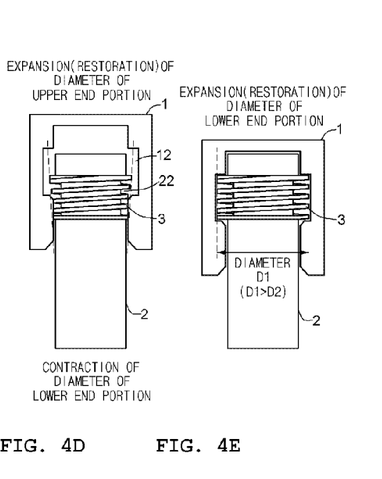
Figure 5A:
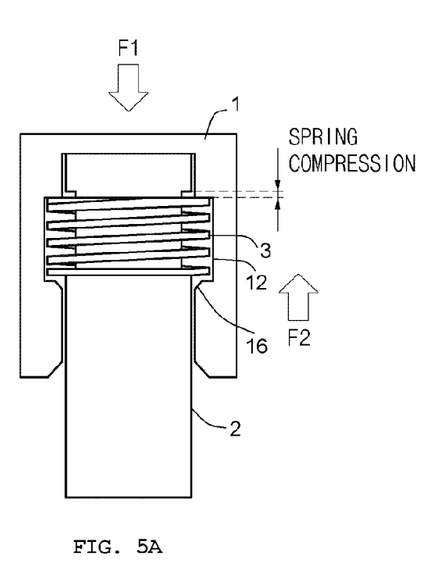
FIGS. 5A and 5B are views illustratively showing situations in which the lever and the knob are assembled to each other according to the exemplary embodiment of the present disclosure.
Figure 5B:
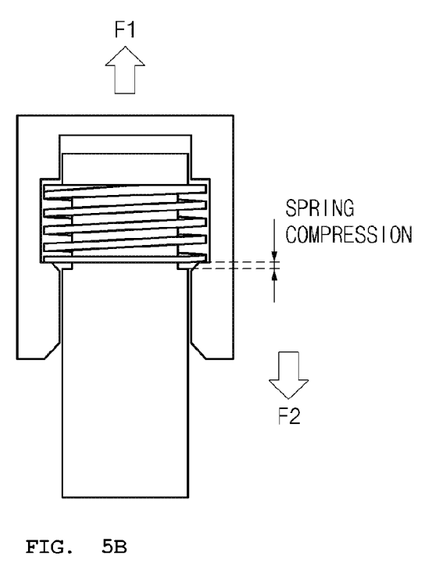

As the knob is continuously lowered, the upper portion of the spring clip 3 meets the accommodating groove 12 of the knob 1 as shown in FIG. 4D, such that the spring clip 3 having a plurality of rings starts to expand into the accommodating groove 12 and be restored to the spring clip's outer diameter of D1. Therefore, as knob 1 is further lowered, the spring clip 3 having a plurality of rings becomes completely expanded as a lower end of the spring clip 3 comes to be disposed within a space formed between the accommodating groove 12 of the knob 1 and the seating groove 22 of the lever 2.

The expansion of the spring clip 3 having a plurality of rings into the space provides a coupling force between the knob 1 and the lever 2 that helps prevent the knob 1 from being removed from the lever 2.

Therefore, as described in relation to FIGS. 4A-4E, an operator may simply couple the knob 1 and the lever 2 to each other by lowering the knob 1 onto the lever 2 on which the spring clip 3 is fitted.

The coupling may be performed without a specific operation. Furthermore, for the embodiments shown in 1B and 2B, at the same time as the knob 1 is lowered onto the lever 2, the direction or orientation of the knob 1 may be adjusted according to the guide grooves 18 and the guide protrusions 28 as described above.

After the knob 1 is fitted onto the lever 2 as described above, the knob 1 may remain on the lever 2 and not be separated therefrom even though an external force F1 is applied to the knob 1 in a vertical direction as shown in FIG. 5. In particular, the knob may be restored to its original position by an upward or downward restoring force F2 provided by the spring clip 3 in response to compression of the spring clip 3.

The spring clip 3 having a plurality of rings may thus serve to absorb a clearance between the knob 1 and lever 2 after the knob 1 and lever 2 are assembled, and serve as a dynamic damper for decreasing vibrations transferred to the knob 1 due to external vibrations of the lever 2 and/or of a vehicle in which the lever 2 is mounted.

As described above, the accommodating groove 12 may include the second inclined surface 16 formed at the lower end portion thereof. Since the diameter D6 of the upper end of the second inclined surface 16 is configured to be smaller than the outer diameter D1 of the spring clip 3 and larger than the inner diameter D2 of the hollow part 10, when a small separation force (e.g., F2) acts on the knob 1, the outer diameter D1 of the spring clip 3 is caught by the diameter of the upper end of the second inclined surface 16, such that the knob 1 and the lever 2 are not separated from each other. Furthermore, when a large separation force acts on the knob 1, the spring clip 3 is deformed, such that the outer diameter of the spring clip 3 rides on the second inclined surface 16 and then descends through the bottom portion of the hollow part 10, thereby making it possible to separate the knob 1 and the lever 2 from each other through the application of a large separation force.

Figure 6:
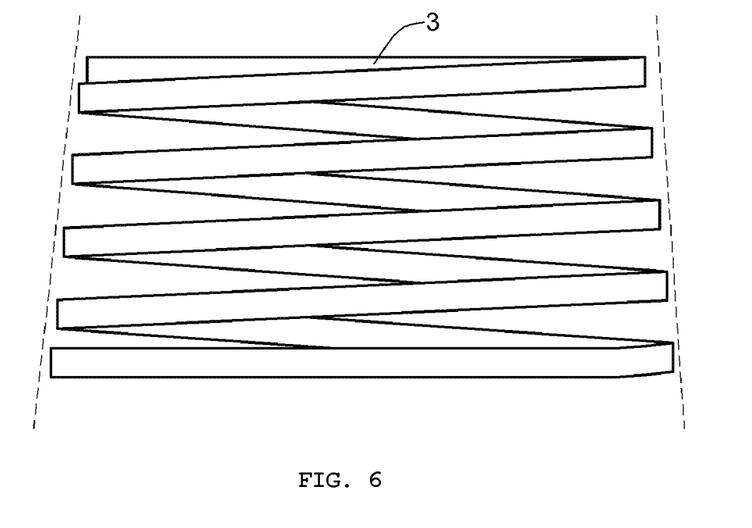
FIGS. 6 and 7 are side views of a spring clip having a plurality of rings according to other exemplary embodiments of the present disclosure.
Figure 7:
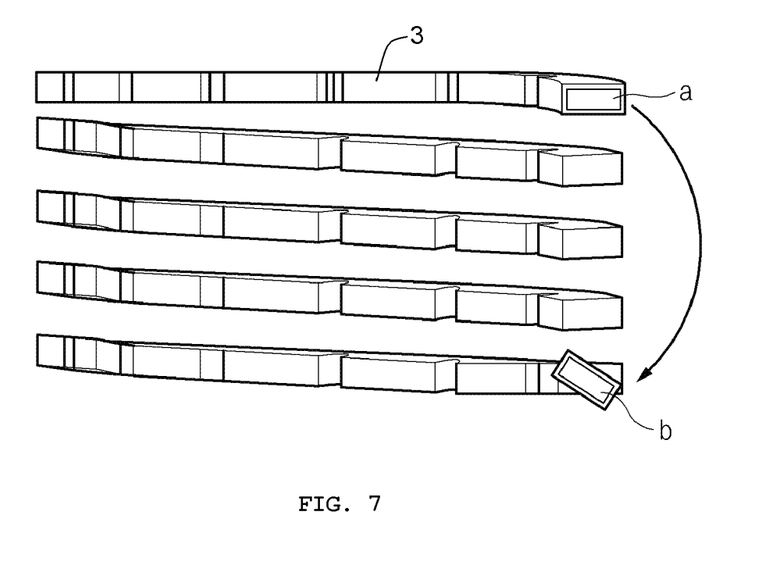

FIGS. 6 and 7 show spring clips 3 having a plurality of rings according to other exemplary embodiments of the present disclosure. First referring to FIG. 6, an outer diameter D1 of the spring clip 3 becomes narrow toward an upward end of the spring clip 3, such that a coupling force between the knob 1 and the lever 2 (i.e., the force necessary to assemble the knob 1 onto the lever 2) is set to be small and a separation force between the knob 1 and the lever 2 (i.e., the forward necessary to disassemble the knob 1 from the lever 2) is set to be large. However, also in this structure, it is preferable that a range of the outer diameter D1 of the spring clip 3 remains larger than the inner diameter D2 of the hollow part 10, and that a range of an inner diameter D3 of the spring clip 3 remains smaller than the diameter D2 of the body part 20 and larger than the diameter D4 of the seating groove 22.

In FIG. 7, a spring clip 3 having a plurality of rings is shown according to still another exemplary embodiment of the present disclosure. A cross section of the spring clip 3 is generally configured to resemble a rectangle that is oriented horizontally (as shown at 'a' in FIG. 7). In the other exemplary embodiment, however, the cross section of the spring clip is not configured to resemble a rectangle that is oriented horizontally, but is instead configured to be inclined (as shown at 'b' in FIG. 7) outwardly with respect to a central axis of the spring clip 3 (such as a central axis through which the diameters of the spring clip are measured), such that the coupling force between the knob 1 and the lever 2 is set to be small and the separation force between the knob 1 and the lever 2 is set to be large, similarly to the embodiment of FIG. 6. The separation force and/or the coupling force as described above may further be adjusted by changing a shape of the cross section of the spring clip as well as a direction or orientation of the cross section of the spring clip.

According to the exemplary embodiment of the present disclosure, one touch assembling between the knob 1 and the lever 2 is possible, the number of components needed for the assembly may be decreased as compared with the prior art, and a separation force between the knob 1 and the lever 2 may be set to be high. In addition, when a force larger than the separation force is applied to the knob 1 and lever 2 assembly, the knob 1 and the lever 2 are configured to be easily separated from each other, thereby making it possible to improve the ease and ability to maintain the component knob 1 and lever 2 parts.

The various components described in the present disclosure may be appropriately changed within ranges in which their functions are not changed, and the components are not limited to the particular sizes or embodiment described herein but may be freely changed without departing from the scope and spirit of the present disclosure as defined by the following claims.

What is claimed is:

1. An assembly of a knob and a lever comprising:
the knob including a substantially cylindrical hollow part formed in the knob, the hollow part extending downwardly through the knob to an opening in a bottom surface of the knob, the hollow part including a narrow portion and an accommodating groove formed in the knob, the accommodating groove having an inner diameter larger than an inner diameter of the narrow portion of the hollow part;
the lever including a substantially cylindrical body part having a diameter corresponding to the inner diameter of the narrow portion of the hollow part, and a seating groove formed in the body part to have a diameter smaller than that of the body part, wherein the seating groove is formed in the body part at a position of the body part that faces the accommodating groove when the knob is assembled to the lever; and
a multi-turn helical spring clip configured to be fitted onto the seating groove of the lever, having an inner diameter larger than the diameter of the seating groove and smaller than the diameter of the body part, and having an outer diameter larger than the diameter of the body part,
wherein the spring clip is deformable in axial and radial directions, and wherein the outer diameter of the spring clip is compressed by the inner diameter of the narrow portion of the hollow part of the knob as the lever is fitted into the knob, thereby deforming the spring clip in the axial direction as well as in the radial direction, and the outer diameter of the spring clip expands into the accommodating groove of the knob when the lever is assembled to the knob, such that the spring clip is disposed in a space formed between the accommodating groove and the seating groove to provide a coupling force between the knob and the lever when the knob is assembled to the lever.

2. The assembly of a knob and a lever according to claim 1, wherein the multi-turn helical spring clip includes slits circumferentially arranged along at least one side thereof such that the spring clip is compressible in a radial direction.

3. The assembly of a knob and a lever according to claim 2, wherein the hollow part has a first inclined surface formed along the opening in the bottom surface of the knob, the first inclined surface having an upper end diameter equal to the inner diameter of the hollow part and a lower end diameter larger than the inner diameter of the hollow part.

4. The assembly of a knob and a lever according to claim 2, wherein the accommodating groove has a second inclined surface formed at a lower end thereof, the second inclined surface having an upper end diameter smaller than the diameter of the accommodating groove and larger than the inner diameter of the hollow part and a lower end diameter equal to the inner diameter of the hollow part.

5. The assembly of a knob and a lever according to claim 2, wherein each of the slits has the same shape.

6. The assembly of a knob and a lever according to claim 2, wherein the slits are disposed along the inner side surface and the outer side surface of rings of the spring clip.

7. The assembly of a knob and a lever according to claim 1, wherein:
the knob includes guide grooves formed therein at predetermined positions along the hollow part,
the lever includes guide protrusions formed on the body part at predetermined positions of the body part,
each guide protrusion has a shape complementary to the shape of a corresponding guide groove, and
corresponding guide grooves and guide protrusions are configured to be aligned when the knob is in a predetermined orientation with respect to the lever.

8. The assembly of a knob and a lever according to claim 7, wherein the hollow part has a first inclined surface formed along the opening in the bottom surface of the knob, the first inclined surface having an upper end diameter equal to the inner diameter of the hollow part and a lower end diameter larger than the inner diameter of the hollow part.

9. The assembly of a knob and a lever according to claim 7, wherein the accommodating groove has a second inclined surface formed at a lower end thereof, the second inclined surface having an upper end diameter smaller than the diameter of the accommodating groove and larger than the inner diameter of the hollow part and a lower end diameter equal to the inner diameter of the hollow part.

10. The assembly of a knob and a lever according to claim 1, wherein the hollow part has a first inclined surface formed along the opening in the bottom surface of the knob, the first inclined surface having an upper end diameter equal to the inner diameter of the hollow part and a lower end diameter larger than the inner diameter of the hollow part.

11. The assembly of a knob and a lever according to claim 1, wherein the accommodating groove has a second inclined surface formed at a lower end thereof, the second inclined surface having an upper end diameter smaller than the diameter of the accommodating groove and larger than the inner diameter of the hollow part and a lower end diameter equal to the inner diameter of the hollow part.

12. The assembly of a knob and a lever according to claim 1, wherein the cross section of one turn of the multi-turn helical spring clip resembles a rectangle that is configured to be inclined outwardly with respect to the radial axis of the spring clip.